(12) United States Patent
Tiramani et al.

(10) Patent No.: US 10,940,731 B2
(45) Date of Patent: Mar. 9, 2021

(54) WHEEL ALIGNMENT MECHANISM

(71) Applicant: Auto IP LLC, Las Vegas, NV (US)

(72) Inventors: Paolo Tiramani, Las Vegas, NV (US); Kyle Denman, North Las Vegas, NV (US)

(73) Assignee: Auto IP LLC, Las Vegas, NV (US)

( * ) Notice: Subject to any disclaimer, the term of this patent is extended or adjusted under 35 U.S.C. 154(b) by 0 days.

(21) Appl. No.: 16/579,571

(22) Filed: Sep. 23, 2019

(65) Prior Publication Data

US 2020/0094641 A1 Mar. 26, 2020

Related U.S. Application Data

(60) Provisional application No. 62/736,066, filed on Sep. 25, 2018, provisional application No. 62/736,021, (Continued)

(51) Int. Cl.
*B60G 7/02* (2006.01)
*B62D 17/00* (2006.01)
(Continued)

(52) U.S. Cl.
CPC .................. *B60G 7/02* (2013.01); *B60G 3/18* (2013.01); *B60G 7/001* (2013.01); *B60G 7/003* (2013.01);
(Continued)

(58) Field of Classification Search
CPC . B60G 7/02; B60G 3/18; B60G 7/003; B60G 15/063; B60G 15/067;
(Continued)

(56) References Cited

U.S. PATENT DOCUMENTS 4,921,271 A 5/1990 Berry et al.
5,775,719 A 7/1998 Holden
(Continued)

OTHER PUBLICATIONS

International Search Report and Written Opinion dated Nov. 15, 2019, in International Application No. PCT/US2019/052485.
(Continued)

*Primary Examiner* — Darlene P Condra
(74) *Attorney, Agent, or Firm* — McCarter & English, LLP

(57) ABSTRACT

A wheel alignment mechanism having a control arm connector, which is adapted for connection to a vehicle suspension control arm positioned between a vehicle chassis and a vehicle wheel, and which has an elongate portion; an inner support frame having a first surface and a second surface on a side of the inner support frame opposing the first surface, the elongate portion of the control arm connector positioned against the first surface at a select one of a first set of plural mounting locations on the first surface, with the first set of plural mounting locations being disposed in a first direction; and an outer support frame adapted to receive a wheel mounting, the connector having a third surface, the second surface of the inner support frame being positioned against the third surface at a select one of a second set of plural mounting locations on the third surface, and with the second set of plural mounting locations being disposed in a second direction approximately perpendicular to the first direction. Means are provided for securing the control arm connector to the inner support frame and the inner support frame to the outer support frame.

9 Claims, 9 Drawing Sheets

Related U.S. Application Data filed on Sep. 25, 2018, provisional application No. 62/735,966, filed on Sep. 25, 2018.

(51) Int. Cl.

| | | |
|---|---|---|
| *B60G 7/00* | (2006.01) | |
| *B62D 21/11* | (2006.01) | |
| *B60G 3/18* | (2006.01) | |
| *B60G 15/06* | (2006.01) | |
| *B60G 21/00* | (2006.01) | |
| *B62D 23/00* | (2006.01) | |

(52) U.S. Cl.
CPC ........... *B60G 7/008* (2013.01); *B60G 15/063* (2013.01); *B60G 15/067* (2013.01); *B60G 21/005* (2013.01); *B62D 17/00* (2013.01); *B62D 21/11* (2013.01); *B62D 23/005* (2013.01); *B60G 2200/144* (2013.01); *B60G 2202/12* (2013.01); *B60G 2202/312* (2013.01); *B60G 2204/124* (2013.01); *B60G 2204/143* (2013.01); *B60G 2204/148* (2013.01); *B60G 2204/61* (2013.01); *B60G 2206/60* (2013.01)

(58) Field of Classification Search
CPC ...... B60G 21/005; B60G 7/008; B60G 7/001; B60G 2200/144; B60G 2202/12; B60G 2202/312; B60G 2204/124; B60G 2204/61; B60G 2206/60; B60G 2204/143; B60G 2204/148; B60G 2204/121; B60G 2204/421; B60G 2202/114; B60G 21/055; B60G 11/36; B60G 3/20; B62D 23/005; B62D 17/00; B62D 21/11
See application file for complete search history.

(56) References Cited

U.S. PATENT DOCUMENTS

| | | | |
|---|---|---|---|
| 6,481,079 B1 * | 11/2002 | Newhan | B60G 3/20 280/86.75 |
| 7,513,514 B1 | 4/2009 | Schlosser et al. | |
| 8,930,075 B2 | 1/2015 | Ruiz | |
| 2005/0051989 A1 * | 3/2005 | Jung | B62D 17/00 280/124.145 |
| 2005/0212244 A1 | 9/2005 | Bobbitt et al. | |
| 2005/0275181 A1 * | 12/2005 | MacIsaac | B60G 3/01 280/124.103 |
| 2008/0048409 A1 * | 2/2008 | Takahashi | B62D 25/08 280/124.116 |
| 2010/0072719 A1 | 3/2010 | Hsu | |
| 2011/0272910 A1 * | 11/2011 | Rezania | B60G 7/001 280/124.134 |
| 2016/0185171 A1 * | 6/2016 | Suzuki | B60G 13/005 180/291 |
| 2016/0185390 A1 * | 6/2016 | Suzuki | B60G 13/005 180/292 |

OTHER PUBLICATIONS

U.S. Appl. No. 16/168,957, filed Oct. 24, 2018, Paolo Tiramani et al.
U.S. Appl. No. 16/168,978, filed Oct. 24, 2018, Paolo Tiramani et al.
U.S. Appl. No. 16/579,554, filed Sep. 23, 2019, Paolo Tiramani et al.
U.S. Appl. No. 16/579,524, filed Sep. 23, 2019, Paolo Tiramani et al.
U.S. Appl. No. 15/589,308, filed Oct. 1, 2019, Paolo Tiramani et al.

* cited by examiner

WHEEL ALIGNMENT MECHANISM

CROSS-REFERENCES TO RELATED APPLICATIONS

This application claims the benefit of U.S. Provisional Application No. 62/736,066, filed Sep. 25, 2018, U.S. Provisional Application No. 62/736,021, filed Sep. 25, 2018 and U.S. Provisional Application No. 62/735,966, filed Sep. 25, 2018.

BACKGROUND OF THE INVENTION

Field of the Invention

This invention relates to vehicle suspension design.

Description of the Related Art

Alignment of the wheels of an automotive vehicle, particularly of the steering wheels, can influence vehicle performance and behavior. Two of the more important wheel alignment parameters are referred to as caster and camber.

Caster is a measure of the departure from the vertical of a wheel's turning axis (the axis about which a wheel is angularly pivoted in order to turn the vehicle). A wheel is referred to as having positive caster if the turning axis of the wheel is angled in the forward direction, as in the case of a chopper-style motorcycle, and is referred to as having negative caster if angled in the rearward direction. FIG. 5A for example schematically depicts a wheel 24 with a turning axis 22 which has a positive caster angle $\alpha_1$ relative to vertical axis 21.

Camber is a measure of the degree to which the plane in which a wheel rotates departs from being perpendicular to the road surface. A complimentary pair of wheels (the front wheel pair or the rear wheel pair) is referred to as having negative camber if the distance separating their points of contact with the road surface is greater than the distance separating the high points of the wheels above the road. A pair of wheels is referred to as having positive camber if the distance separating their points of contact with the road surface is less than the distance separating the high points of the wheels above the road. FIG. 5B for example schematically depicts a wheel 24 that rotates in a plane parallel to plane 23 (seen edge-on in FIG. 5B) and which has a negative caster angle $\alpha_2$ relative to vertical axis 21.

A third wheel alignment parameter is referred to as toe. Toe is a measure of the degree to which the plane in which a wheel rotates departs from being parallel to the direction of vehicle travel on the road surface. A pair of wheels is referred to as having "toe in" if the distance separating their most forward points in the direction of forward vehicle motion is less than the distance separating their most rearward points from the direction of forward vehicle motion. Correspondingly, a pair of wheels is referred to as having "toe out" if the distance separating their most forward points in the direction of forward vehicle motion is greater than the distance separating their most rearward points from the direction of forward vehicle motion.

For race track and other performance vehicles, the optimum caster and camber settings can differ depending on the specific road course. However, it is oftentimes difficult to easily change vehicle caster and camber for different road courses. In addition, in existing suspension systems adjustment of one wheel alignment parameter oftentimes also deleteriously impacts one or both of the other parameters discussed above.

SUMMARY OF THE INVENTION

The present invention provides an automotive suspension component assembly that features a relatively quick mechanical means to adjust the caster and camber of a vehicle suspension. In addition, the component assembly of the present invention permits independent caster and camber adjustment, where adjustment of one (caster or camber) does not deleteriously impact the other, and has a lesser impact on toe.

In one aspect, the invention is directed to a wheel alignment mechanism for a vehicle suspension which comprises a control arm connector, adapted for connection to a vehicle suspension control arm positioned between a vehicle chassis and a vehicle wheel, the control arm connector having an elongate portion; an inner support frame having a first surface and a second surface on a side of the inner support frame opposing the first surface, the elongate portion of the control arm connector positioned against the first surface at a select one of a first set of plural mounting locations on the first surface, the first set of plural mounting locations being disposed in a first direction; an outer support frame adapted to receive a wheel mounting, the connector having a third surface, the second surface of the inner support frame being positioned against the third surface at a select one of a second set of plural mounting locations on the third surface, the second set of plural mounting locations being disposed in a second direction approximately perpendicular to the first direction; and means for securing the control arm connector to the inner support frame and the inner support frame to the outer support frame.

These and other aspects of the present invention are described in the drawings annexed hereto, and in the description of the preferred embodiments and claims set forth below.

DETAILED DESCRIPTION OF THE PREFERRED EMBODIMENTS

Figure 1A:
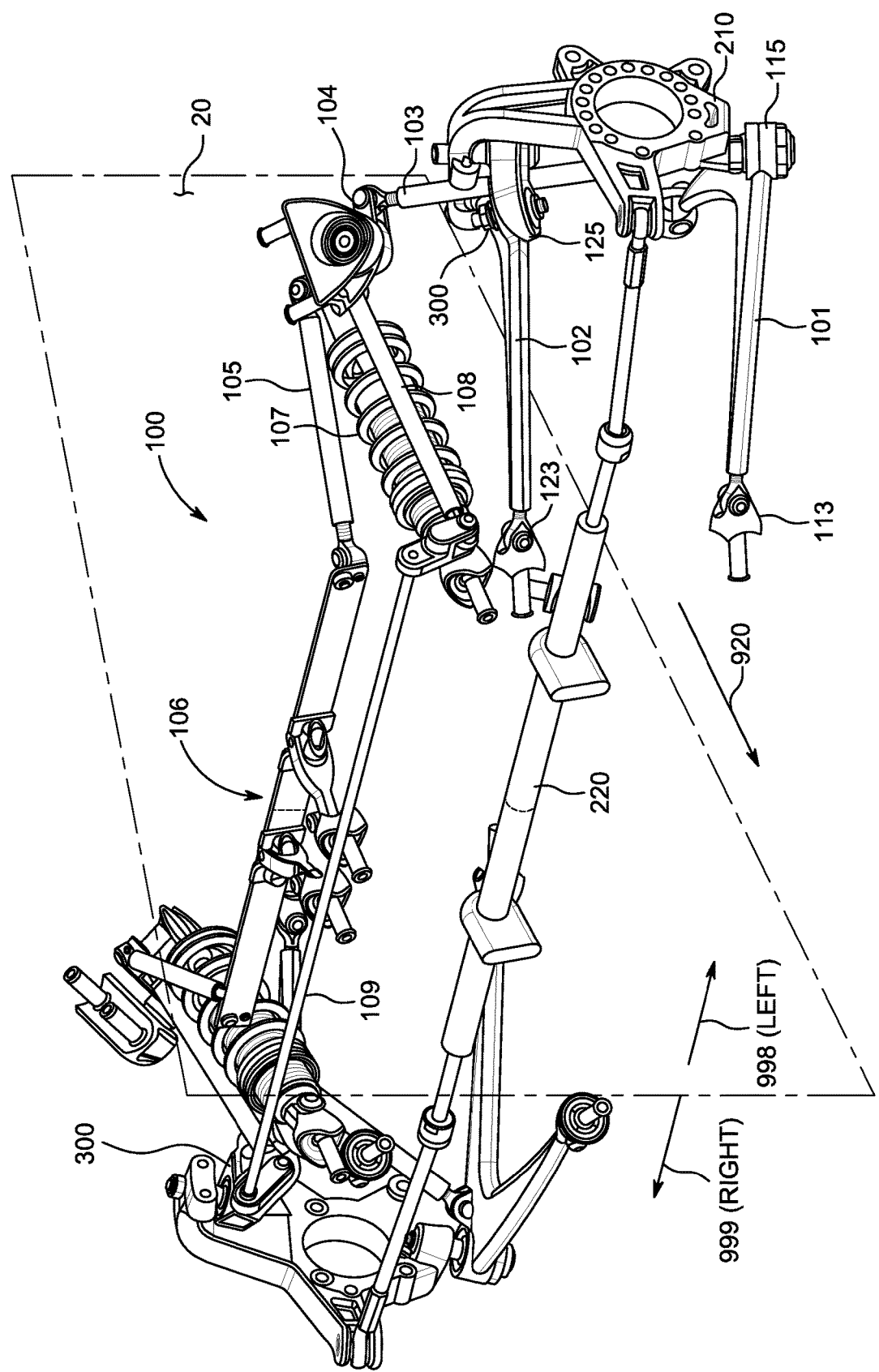
FIG. 1A is a perspective view of a vehicle suspension utilizing the wheel alignment mechanism of the present invention.

FIG. 1A depicts a suspension 100 which utilizes wheel alignment mechanism 300, described further below. Suspension 100 is in an orientation for mounting to the forward portion of a vehicle chassis 15 of a vehicle 10; neither vehicle chassis 15 nor vehicle 10 is shown in the drawings so as to more clearly illustrate the inventions described and claimed herein. The direction of forward travel of vehicle 10 is depicted in FIG. 1A and elsewhere by the arrow 920. Accordingly, reference herein to the "forward" direction, and like references, refers to orientations or movement toward the head of the arrow 920. Correspondingly, reference herein to the "rearward" direction, and like references, refers to orientations or movement away from the head of the arrow 920. Any plane or direction parallel to the surface on which the vehicle 10 and its chassis 15 travels is referred to herein as the "horizontal" plane or direction, and any plane or direction orthogonal to that surface is referred to as the "vertical" plane or direction.

The suspension 100 depicted in FIG. 1A is symmetric about the vertically-oriented longitudinal plane 20, which divides suspension 100 into equal halves and which is parallel to the direction of travel. Any vertical plane parallel to this longitudinal plane 20, and any generally horizontal orientation approximately parallel to this longitudinal plane, is referred to herein as being oriented in a longitudinal direction. Any vertical plane perpendicular to this longitudinal plane 20, and any generally horizontal orientation approximately orthogonal to this longitudinal plane, is referred to herein as being oriented in a transverse direction. In addition, reference herein to the "left" side of suspension 100, or to portions or components positioned on the left side of suspension 100, refers to the portions or components to the left of longitudinal plane 20, as referenced with regard to the left-hand side of a driver, facing forward; for clarity, the "Left" side of suspension 100 is denoted as such ("LEFT"; alternatively denoted direction 998) in FIG. 1A.

Likewise, reference herein to the "right" side of suspension 100, or to portions or components positioned on the right side of suspension 100, refers to the portions or components to the right of longitudinal plane 20, as referenced with regard to the right-hand side of a driver, facing forward; again for clarity, the "Right" side of suspension 100 is denoted as such ("RIGHT"; alternatively denoted direction 999) in FIG. 1A. For convenience of reference, suspension 100 will be described generally with reference to the left side of suspension 100, it being the case that the description equally applies to the right side of suspension 100.

General Suspension Description

Figure 1B:
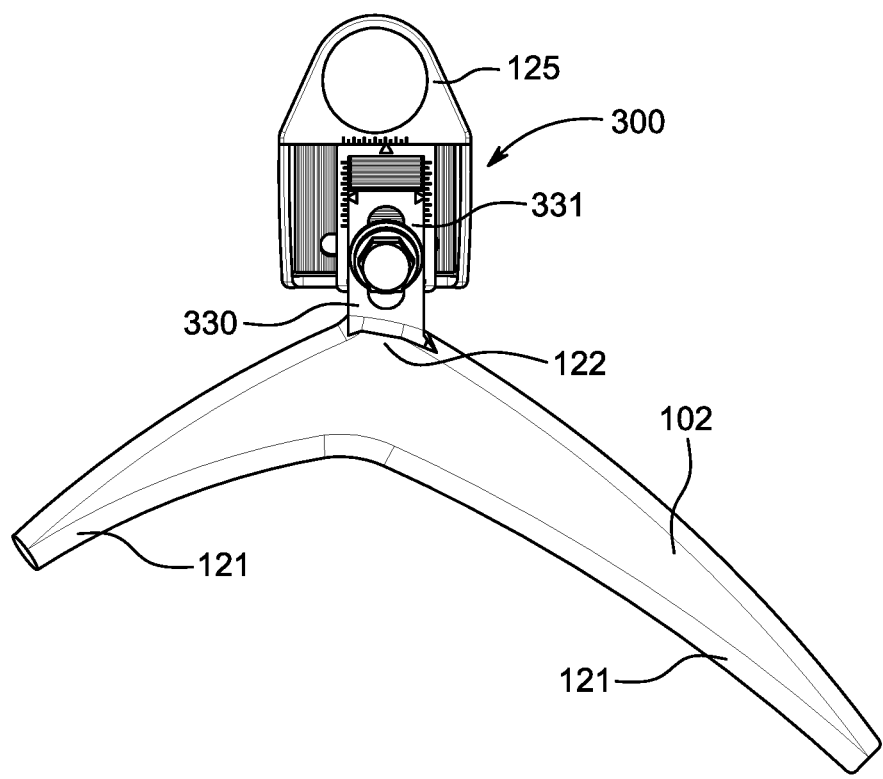
FIG. 1B is a top view of an upper control arm on which is mounted one embodiment of a wheel alignment mechanism in accordance with the present invention.
Figure 1C:
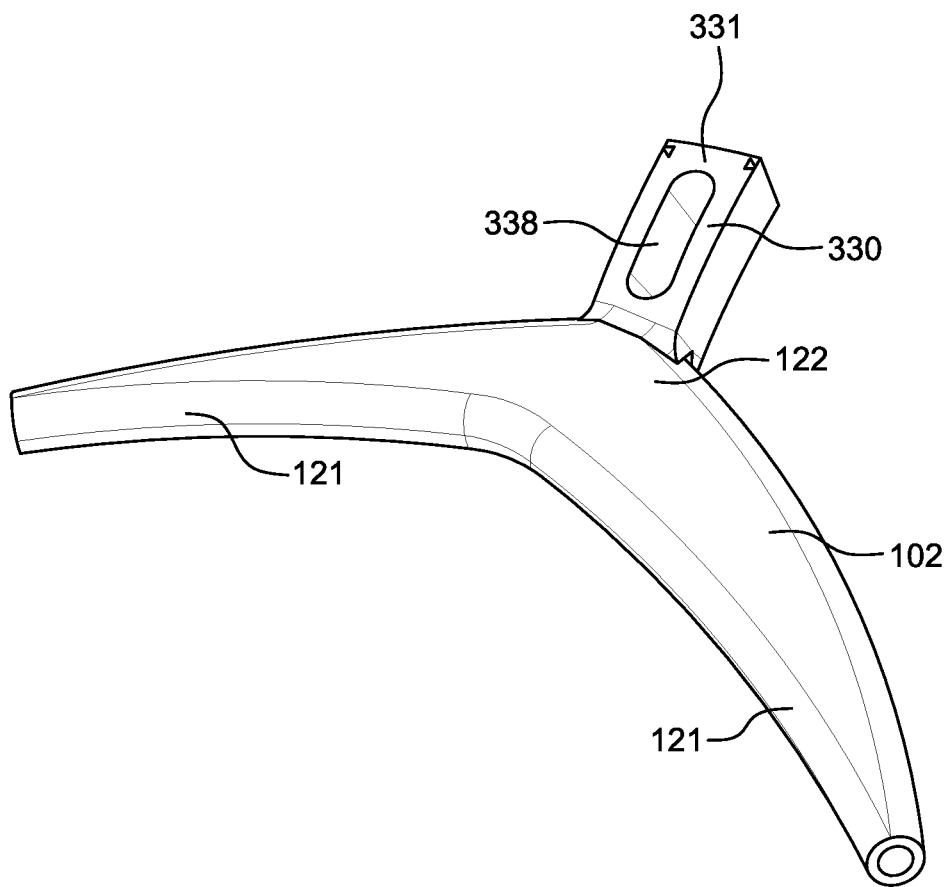
FIG. 1C is the upper control arm shown in FIG. 1B with portions of the wheel alignment mechanism removed for illustrative purposes.
Figure 1D:
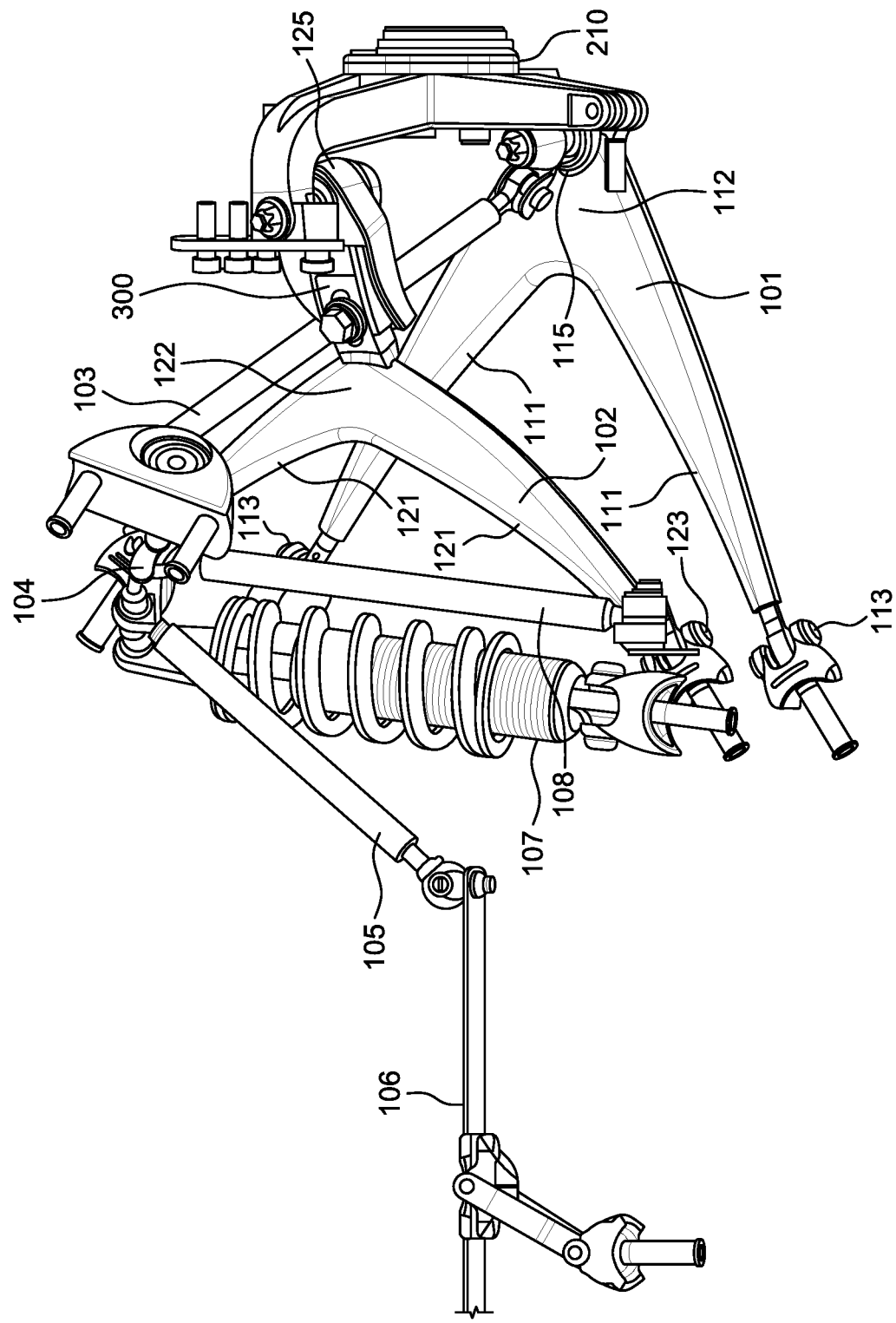
FIG. 1D is a perspective view of the left side of a vehicle suspension utilizing the wheel alignment mechanism of the present invention with the upper control arm depicted in FIG. 1B.

Each side of suspension 100 utilizes an A-arm wheel suspension having a lower control arm 101 and an upper control arm 102. As shown in FIGS. 1A and 1D, the base portions 111 of lower control arm 101 are adapted to be secured to chassis 15 with two lower bushings 113, which permit control arm 101 to be angularly rotated about the bushings. The apex portion 112 of lower control arm 101, shown in FIG. 1D, is provided with a lower sleeve 115 for receiving a ball joint. Likewise, the base portions 121 of upper control arm 102 are adapted to be secured to chassis 15 with two upper bushings 123, which permit upper control arm 102 to be angularly rotated about the bushings. The wheel alignment mechanism 300 is located on the apex portion 122 of upper control arm 102. Wheel alignment mechanism 300 is provided with an upper sleeve 125 for receiving a ball joint, as shown for example in FIGS. 1B and 2A.

FIGS. 1A and 1D additionally shows a wheel hub 210, on which is to be mounted a wheel spindle, a brake mechanism and a wheel. Wheel hub 210 includes two ball joints that are received in lower sleeve 115 and upper sleeve 125, and which allow wheel hub 210 to be pivoted in sleeves 115, 125 to permit the vehicle to be steered. A steering rack 220 provides driver-initiated steering movements to the hub assemblies 210.

Each side of suspension 100 is provided with a coil over shock absorber 107 positioned in a generally longitudinal orientation between the chassis 15 and a respective bell crank 104. A bell crank 104 is connected on each side of suspension 100 via a main pushrod 103 to a respective lower control arm 101. Shock absorber 107 is actuated via the bell crank 104 and the main pushrod 103 connected thereto, upon for example vertical movement of the respective lower control arm 101.

Referring to FIG. 1A, suspension 100 includes a transversely-oriented anti-roll torsion bar 109. Each side of torsion bar 109 is connected to an anti-roll pushrod 108, shown in FIGS. 1A and 1D, which is positioned in a generally longitudinal direction, approximately parallel to shock absorber 107, and is connected to a respective bell crank 104. Thus anti-roll torsion bar 109 is actuated by pushrod 108 via the bell crank 104 and the main pushrod 103 connected thereto, upon for example vertical movement of a lower control arm 101.

Suspension 100 further includes a heave spring assembly 106, which has a generally rectangular transversely-oriented configuration. Each side of heave spring assembly 106 is connected to a heave pushrod 105, which is connected to a respective bell crank 104, and thus heave spring assembly 106 can be actuated via a bell crank 104 and the main pushrod 103 connected thereto.

Further details regarding the design and operation of the components of suspension 100 referenced above can be found in U.S. Provisional Application No. 62/736,021 entitled "Vehicle Suspension" filed Sep. 25, 2018 and having the same inventors as the subject application, the contents of which are hereby incorporated by reference as if fully set forth herein. Likewise, the design and operation of the components of suspension 100 referenced above can also be found in U.S. Nonprovisional patent application Ser. No. 16/579,524, entitled "Vehicle Suspension," having the same inventors as the subject application and filed on the same date as the subject application, and the contents of which are hereby incorporated by reference as if fully set forth herein, including the details regarding the design and operation of the components of suspension 100 referenced above, found for example at paragraphs 35-41, 43-56, 57 ($1^{st}$ and $2^{nd}$ sentences) and 83-102, and in FIGS. 1A-4 and 11-13B thereof.

The components of suspension 100 (e.g., control arms 101, 102, bell cranks 104, heave spring assembly 106, shock absorbers 107) are secured to vehicle chassis 15 in a manner appropriate to their function. Systems for securing vehicle components to a vehicle chassis can be found in U.S. Provisional Application No. 62/735,966 filed on Sep. 25, 2018, entitled "Chassis Anchoring Systems"; the contents of that "Chassis Anchoring System" U.S. Provisional Application relating to the securing of the components of suspension 100 to a vehicle chassis are hereby incorporated by reference into the present application as if fully set forth herein. Systems for securing vehicle components to a vehicle chassis can also be found in U.S. Nonprovisional patent application Ser. No. 16/579,554, entitled "Chassis Anchoring Systems" naming the same inventors as the subject application and filed on the same date as the subject application; the contents of that "Chassis Anchoring Systems" U.S. Nonprovisional Patent Application are hereby incorporated by reference as if fully set forth herein, particularly including the disclosure relating to anchoring systems used to secure suspension components to an exoskeleton/space frame for example and to load-bearing components generally, found for example at paragraphs 38-68 and in FIGS. 2A-6 thereof. Systems for securing vehicle components to a vehicle chassis can yet further be found in the aforementioned U.S. Provisional Patent Application No. 62/736,021 entitled "Vehicle Suspension" filed Sep. 25, 2018 and having the same inventors as the subject application, and additionally in the aforementioned U.S. Nonprovisional patent application Ser. No. 16/579,524, entitled "Vehicle Suspension," having the same inventors as the subject application and filed on the same date as the subject application; the contents of that "Vehicle Suspension" U.S. Nonprovisional Patent Application are hereby incorporated by reference as if fully set forth herein, particularly including the disclosure relating to anchoring systems used to secure suspension components to an exoskeleton/space frame for example and to load-bearing components generally, found for example at paragraphs 57 ($1^{st}$ and $2^{nd}$ sentences) and 58-82, and in FIGS. 5A-10 thereof.

Wheel Alignment Mechanism (300)

Wheel alignment mechanism 300 described herein can be partly integrated into a control arm or can be provided as a separate part to be bolted onto a separate control arm. One embodiment, in which wheel alignment mechanism 300 is partly integrated into upper control arm 102, is shown in the FIGS. 1A-1D. In an alternative embodiment, alignment mechanism 300 can be bolted onto a control arm, using for example the mounting tang 332 depicted in FIGS. 2A-4. The specifics of the present invention are generally described below with respect to this latter embodiment except as noted below, although it should be understood that the design concepts and principles of operation are the same for both embodiments.

Figure 2A:
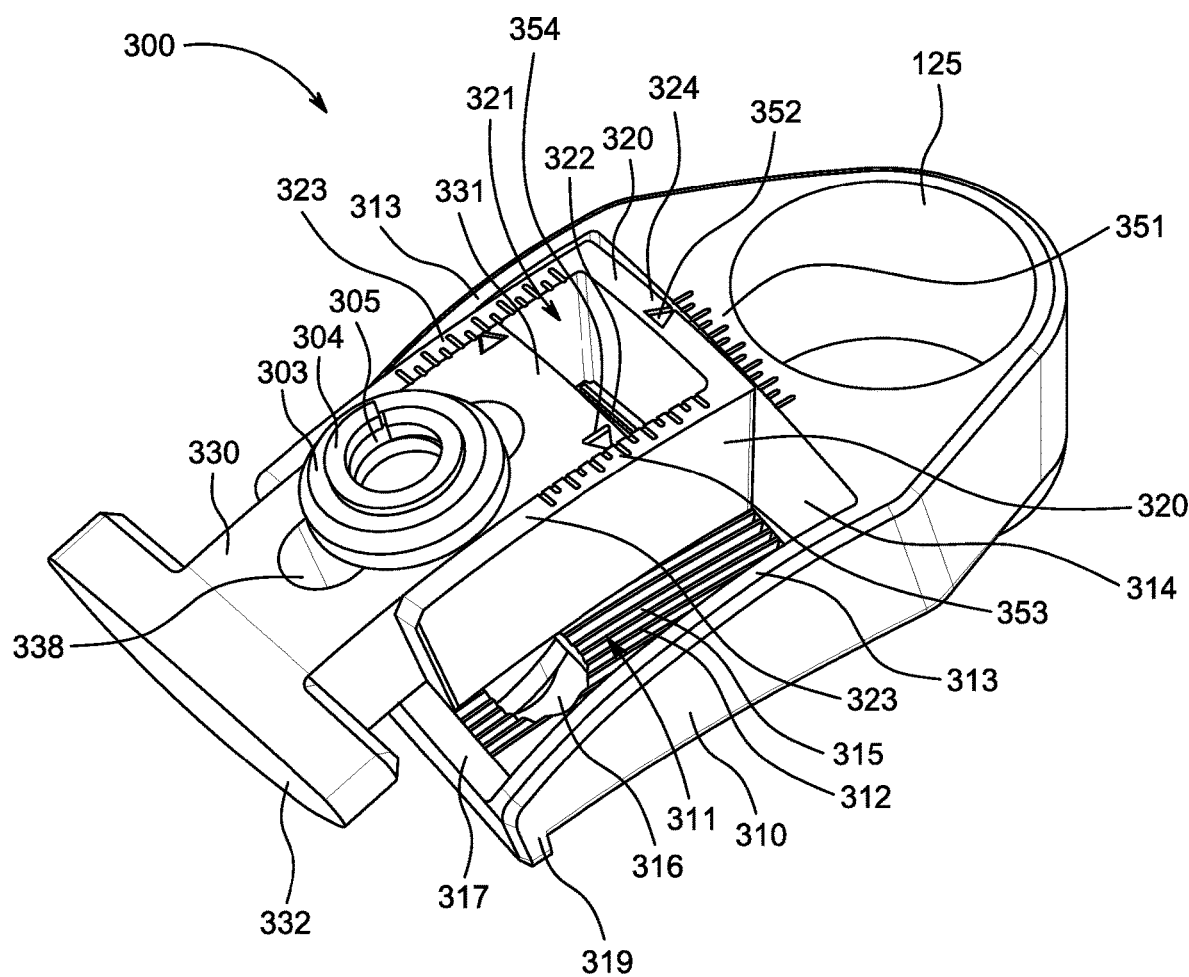
FIG. 2A is a top perspective view of an embodiment of the wheel alignment mechanism in accordance with the present invention.

As shown in FIG. 2A, wheel alignment mechanism 300 includes outer support frame 310, inner support frame 320 and control arm connector 330. The three components 310, 320 and 330 are in a nested relationship and are secured together by a threaded alignment bolt 301 shown in FIG. 2B. Alignment bolt 301 passes through apertures in the three components 310, 320 and 330, as described further below. Alignment bolt 301 extends through the underside 318 of outer support frame 310 (see FIG. 2B), and engages stop nut 306 positioned against underside 318 to secure the components 310, 320 and 330 together. Alignment bearing washer 303 shown in FIG. 2A is positioned below the head of alignment bolt 301 and an alignment lock washer 304, to distribute compressive loads across the face of control arm connector 330. Alignment lock washer 304 is positioned between alignment bearing washer 303 and the head of alignment bolt 301. A lock washer recess 305 is provided in bearing washer 303 to receive lock washer 304.

Outer support frame 310 includes caster cradle 311 and upper sleeve 125 adjacent thereto. Caster cradle 311 defines an approximately U-shaped cavity shown in FIG. 2A that is bounded by a caster cradle floor 312 and three walls, namely two opposed caster cradle transverse walls 313 and a caster cradle longitudinal wall 314 adjacent upper sleeve 125. A longitudinally-oriented caster rail 317 is provided at the end of caster cradle 311 opposite caster cradle longitudinal wall 314 to form a low-profile shoulder, above which caster cradle 311 is generally open.

As depicted in FIG. 2A, caster cradle floor 312 includes on its surface a series of repeating linear caster cradle castellations 315, each of whose lengths is oriented in a transverse direction, and which preferably repeat in the longitudinal direction to cover a substantial part or all of the surface of floor 312. The cross-sectional geometry of each of castellations 315 preferably is an isosceles trapezoid, each substantially the same as the other. Caster cradle floor 312 has an aperture, a longitudinally oriented caster adjustment slot 316, through which passes alignment bolt 301.

As shown in FIG. 2A, inner support frame 320 is roughly rectangular in shape. Inner support frame 320 is received in caster cradle 311 and positioned against caster cradle floor 312. The width of inner support frame 320 in the longitudinal direction is less than the distance between caster cradle transverse walls 313, and the length of inner support frame 320 in the transverse direction is slightly less than the distance between longitudinally-oriented caster rail 317 and caster cradle longitudinal wall 314, so that inner support frame 320 can be positioned at different mounting locations within caster cradle 311.

Figure 2B:
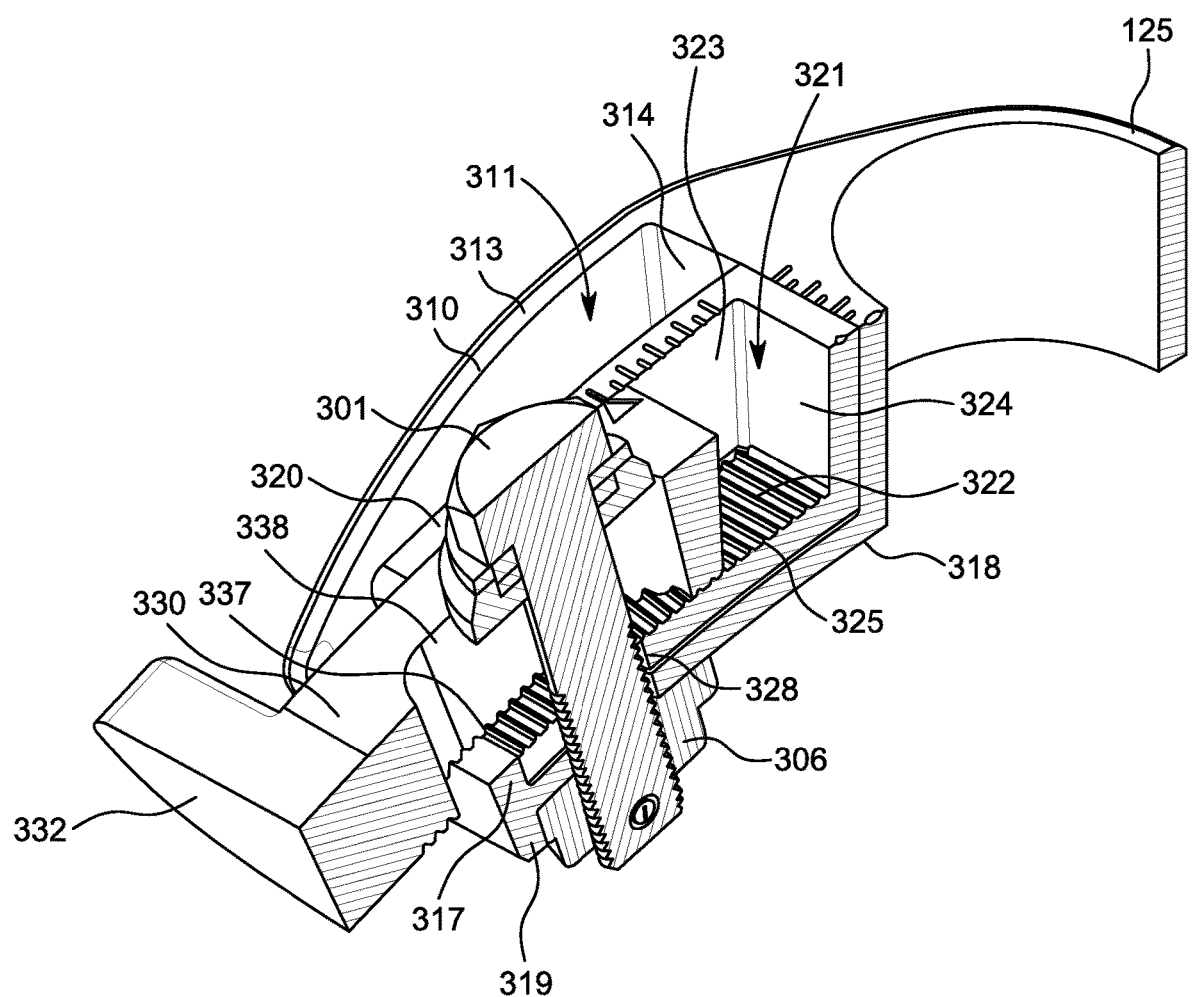
FIG. 2B is a transverse section view of the embodiment shown in FIG. 2A.
Figure 3:
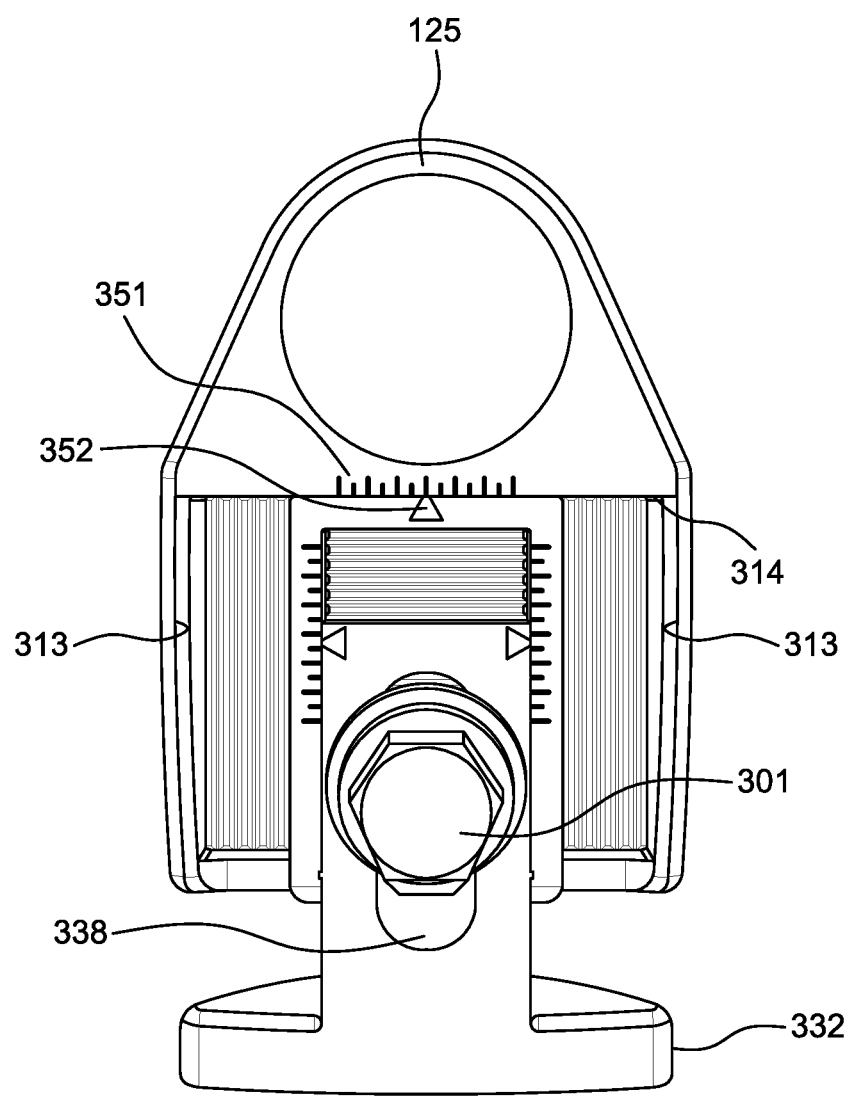
FIG. 3 is a top view of the embodiment of the wheel alignment mechanism shown in FIG. 2A.

Referring to FIGS. 2A and 2B, inner support frame 320 includes camber cradle 321, which is a U-shaped cavity that is defined by a camber cradle floor 322 and three walls, namely two opposed camber cradle transverse walls 323 and camber cradle longitudinal wall 324. Camber cradle floor 322 defines an approximately circular aperture 328 through which passes alignment bolt 301.

Figure 4:
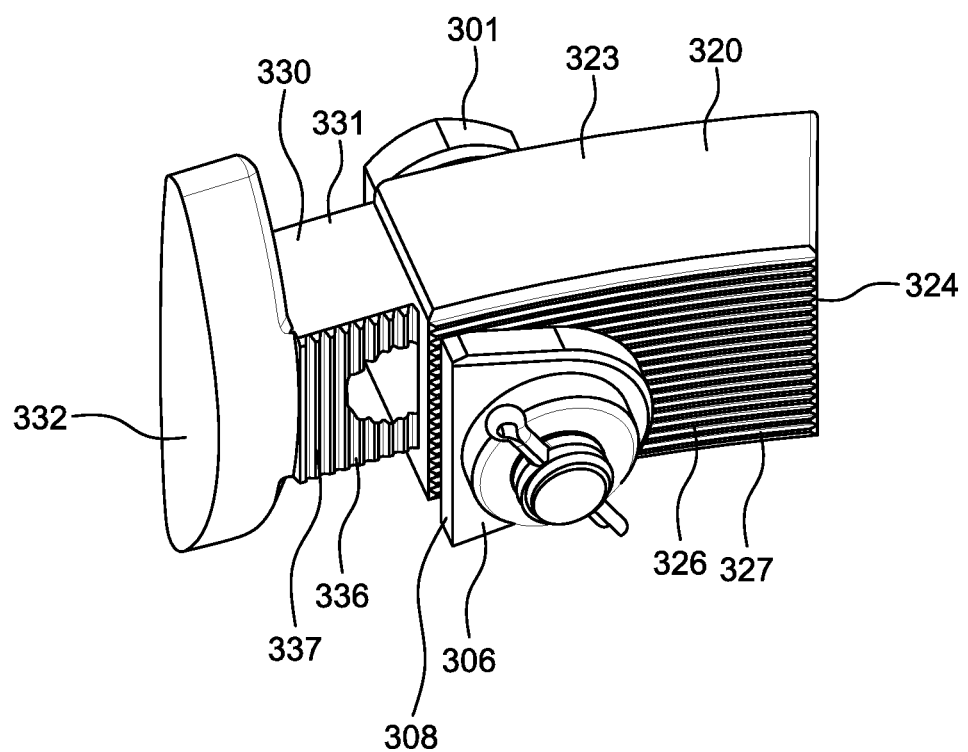
FIG. 4 is a bottom perspective view of the control arm connector, inner support frame and stop nut of the present invention (outer support frame removed for illustrative purposes).

As shown for example in FIG. 2B, camber cradle floor 322 includes on its surface a series of repeating linear camber cradle castellations 325, each of whose lengths is oriented in a longitudinal direction, and which preferably repeat in the transverse direction to cover a substantial part or all of the surface of floor 322. The cross-sectional geometry of each of castellations 325 preferably is an isosceles trapezoid, each substantially the same as the other. Referring to FIG. 4, the underside 326 of inner support frame 320 includes a series of repeating linear camber cradle caster castellations 327, each of whose lengths is oriented in the transverse direction, and which preferably repeat in the longitudinal direction to cover a substantial part or all of the surface of underside 326 (note that FIG. 4 omits outer support frame 310 for illustrative purposes). The cross-sectional geometry of each of castellations 327 preferably is an isosceles trapezoid, each substantially the same as the other and substantially the same as castellations 315 of caster cradle floor 312 shown in FIG. 2A, such that underside 326 meshes securely against caster cradle floor 312 when the two components are urged together by alignment bolt 301 and stop nut 306. The number of caster cradle castellations 315 in the embodiment shown is greater than the number of camber cradle caster castellations 327.

Caster Adjustment. When bolt 301 is unscrewed from stop nut 306 a distance greater than the height of castellations 315 (or of castellations 327), inner support frame 320 can be repositioned in the longitudinal direction by increments approximately equal to the distance between adjacent ones of castellations 315/327, so as to allow the vehicle operator to adjust the caster of the wheel in a simple manner. To assist in making caster adjustments, a caster setting pointer 352 can be embossed or otherwise formed on the top of camber cradle longitudinal wall 324, as shown in FIG. 2A, which coordinates with a caster setting index 351 embossed or otherwise formed across the top of caster cradle longitudinal wall 314, also as shown in FIG. 2A.

Control arm connector 330 includes a camber adjustment arm 331 that is roughly rectangular in shape. The end of caster cradle 311 opposite caster cradle longitudinal wall 314 is generally open above caster rail 317, as is the end of camber cradle 321 opposite camber cradle longitudinal wall 324, which permits camber adjustment arm 331 to be received within camber cradle 321 and positioned against camber cradle floor 322. The width of camber adjustment arm 331 is preferably slightly less than the longitudinal distance separating camber cradle transverse walls 323, so that the transverse-most end of camber adjustment arm 331 can be positioned at any of a series of locations along the transverse length of camber cradle floor 322, and thereby provide a series of plural mounting locations (in the transverse direction) of camber adjustment arm 331 within camber cradle 321. Camber adjustment arm 331 defines a transversely oriented camber adjustment slot 338 through which passes alignment bolt 301.

In the embodiments shown in FIGS. 2A-4, camber adjustment arm 331 of control arm connector 330 is attached to a longitudinally-oriented bar, mounting tang 332. Mounting tang 332 in the configuration shown can be received in a clamping fixture (not shown) secured to the apex 122 of an upper control arm 102, or can be drilled to be bolted to the apex 122 of an upper control arm 102. In embodiments of the present invention in which wheel alignment mechanism is integrated into the control arm, as shown in FIGS. 1A-1D, camber adjustment arm 331 of control arm connector 330 is integrally attached to apex 122, as by welding, or is forged as part of the control arm.

Figure 5A:
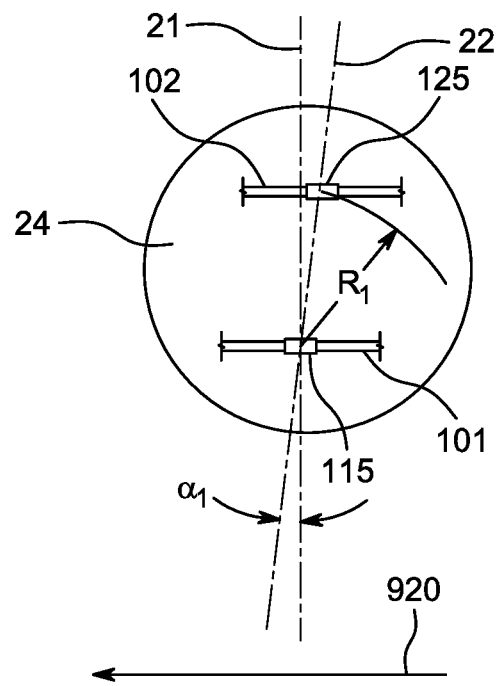
FIG. 5A is a schematic diagram showing the caster relationships relating to the present invention.

In the present invention, it is preferred that caster cradle floor 312 and the underside 326 of inner support frame 320 each not be flat, but rather curved in longitudinal direction. In this regard, FIG. 5A schematically depicts control arms 101, 102 with a wheel mounted thereon, where the forward direction is as shown by arrow 920. As the caster angle $\alpha_1$ is varied, sleeve 125 can be considered to move in an arc, in a longitudinal plane, defined by $R_1$. Accordingly, referring to FIG. 5A, it is preferred that caster cradle floor 312 be convexly curved, in the longitudinal direction, at a radius of curvature $R_1$, where $R_1$ is the distance between upper sleeve 125 and lower sleeve 115. Likewise it is preferred that underside 326 of inner support frame 320 be concavely curved, in the longitudinal direction, at a radius of curvature $R_1$. For the suspension 100 shown in FIG. 1A, $R_1$ is the vertical distance between sleeves 115 and 125.

Figure 5B:
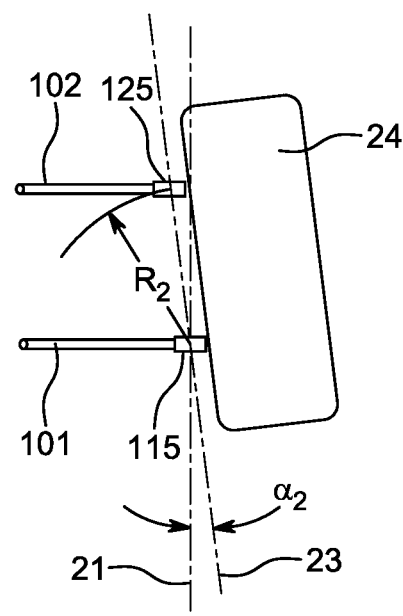
FIG. 5B is a schematic diagram showing the camber relationships relating to the present invention.

Also in the present invention, it is preferred that camber cradle floor 322 and the underside 336 of control arm connector 330 each not be flat, but rather curved in the transverse direction. In this regard, FIG. 5B schematically depicts control arms 101, 102 with a wheel mounted thereon, where the forward direction is toward the viewer (out of the figure). As the camber angle $\alpha_2$ is varied, sleeve 125 can be considered to move in an arc, in a transverse plane, defined by $R_2$. Accordingly, referring to FIG. 5B, it is preferred that camber cradle floor 322 be convexly curved, in the transverse direction, at a radius of curvature $R_2$, and that underside 336 be concavely curved at the same radius of curvature $R_2$. For the suspension 100 shown in FIG. 1A, $R_2$ is the vertical distance between sleeves 115 and 125; accordingly, for suspension 100 $R_2$ and $R_1$ are approximately the same value.

Referring to FIG. 4, the underside 336 of camber adjustment arm 331 includes a series of repeating linear adjustment arm camber castellations 337, each oriented in a longitudinal direction, and which preferably repeat in the transverse direction to cover a substantial part or all of the surface of underside 336. The cross-sectional geometry of each of castellations 337 preferably is an isosceles trapezoid, each substantially the same as the other and substantially the same as castellations 325 of camber cradle floor 322 shown in FIG. 2B, such that underside 336 meshes securely against camber cradle floor 322 when the two components are urged together by alignment bolt 301 and stop nut 306.

Camber Adjustment. When bolt 301 is unscrewed from nut 306 a distance greater than the height of castellations 325 (or of castellations 337), control arm connector 330 can be repositioned in the transverse direction by increments approximately equal to the distance between adjacent ones of castellations 325/337, so as to allow the vehicle operator to adjust the camber of the wheel in a simple manner. To assist in making camber adjustments, one or more camber setting pointers 354 can be embossed or otherwise formed on the sides of camber adjustment arm 331, as shown in FIG. 2A, which coordinates with one or more camber setting indices 353 embossed or otherwise formed across the top of each camber cradle transverse wall 323, also as shown in FIG. 2A.

It is preferred that the height of caster cradle castellations 315 (i.e., the distance from caster cradle floor 312 to the top of castellations 315) and of camber cradle caster castellations 327 be larger than the height of camber cradle castellations 325 (i.e., the distance from camber cradle floor 322 to the top of castellations 325) and of adjustment arm camber castellations 337. Since typically camber is adjusted more frequently than caster, the foregoing height relationships permits the operator to make a camber adjustment while keeping the caster setting unchanged. It is additionally preferred that the height of alignment lock washer 304, in its uncompressed state, be greater than the combined height of caster cradle castellations 315 and camber cradle castellations 325.

Optionally, as shown in FIGS. 2A and 2B, the underside 318 of outer support frame 310 which is distal from upper sleeve 125 is provide with a longitudinally-oriented stop nut rail 319 against which is positioned stop nut shoulder 308 shown in FIG. 4. This design feature permits loosening the head of alignment bolt 301, using for example a socket wrench, without the need to secure stop nut 306 from movement with for example a box wrench.

Although wheel alignment mechanism 300 is shown as utilized in connection with a front suspension of a vehicle (i.e., suspension 100 is depicted as oriented for mounting to the forward portion of a vehicle chassis 15 of a vehicle 10), mechanism 300 can also be used in connection with a rear suspension of a vehicle.

The foregoing detailed description is for illustration only and is not to be deemed as limiting the inventions, which are defined in the appended claims.

What is claimed is:

1. A wheel alignment mechanism for a vehicle suspension, comprising:
   a control arm connector, adapted for connection to a vehicle suspension control arm positioned between a vehicle chassis and a vehicle wheel, the control arm connector having an elongate portion;
   an inner support frame having a first surface and a second surface on a side of the inner support frame opposing the first surface, the elongate portion of the control arm connector positioned against the first surface at a select one of a first set of plural mounting locations on the first surface, the first set of plural mounting locations being disposed in a first direction;

an outer support frame adapted to receive a wheel mounting, the outer support frame having a third surface, the second surface of the inner support frame being positioned against the third surface at a select one of a second set of plural mounting locations on the third surface, the second set of plural mounting locations being disposed in a second direction approximately perpendicular to the first direction; and means for securing the control arm connector to the inner support frame and the inner support frame to the outer support frame.

2. A wheel alignment mechanism for a vehicle suspension as in claim 1, wherein the inner support frame comprises a first cradle having a first wall and a second wall, each oriented in the first direction, which are joined by a third wall oriented in the second direction, and wherein the first surface is bounded by the first, second and third walls to define the first cradle.

3. A wheel alignment mechanism for a vehicle suspension as in claim 1, wherein the first surface is convexly shaped in the first direction at a select radius of curvature, and the elongate portion of the control arm connector positioned against the first surface is concavely shaped at the select radius of curvature.

4. A wheel alignment mechanism for a vehicle suspension as in claim 1, further comprising a first set of plural linear castellations formed on the first surface, each linear castellation of the first set of plural linear castellations oriented in the second direction, and a second set of plural linear castellations formed on the portion of the control arm connector positioned against the first surface, each linear castellation of the second set of plural linear castellations oriented in the second direction, the first set of plural linear castellations being in a meshing relationship with the second set of plural linear castellations at the select one of the first set of plural mounting locations.

5. A wheel alignment mechanism for a vehicle suspension as in claim 1, wherein the outer support frame comprises a second cradle having a fourth wall and a fifth wall, each oriented in the first direction, which are joined by a sixth wall oriented in the second direction, and wherein the third surface is bounded by the fourth, fifth and sixth walls to define the second cradle.

6. A wheel alignment mechanism for a vehicle suspension as in claim 1, wherein the third surface is convexly shaped in the second direction at a select radius of curvature, and the second surface of the inner support frame positioned against the third surface is concavely shaped in the second direction at the select radius of curvature.

7. A wheel alignment mechanism for a vehicle suspension as in claim 1, further comprising a third set of plural linear castellations formed on the third surface, each linear castellation of the third set of plural linear castellations oriented in the first direction, and a fourth set of plural linear castellations formed on the second surface of the inner support frame positioned against the third surface, each linear castellation of the fourth set of plural linear castellations oriented in the first direction, the third set of plural linear castellations being in a meshing relationship with the fourth set of plural linear castellations at the select one of the second set of plural mounting locations.

8. A vehicle suspension containing a wheel alignment mechanism, comprising:

a load-bearing component assembly comprising a wheel hub assembly, an upper control arm having an apex portion, and a lower control arm, the upper and lower control arms adapted to be pivotally secured to a vehicle chassis;

a control arm connector joined to the apex portion of the upper control arm, the control arm connector having an elongate portion;

an inner support frame having a first surface and a second surface on a side of the inner support frame opposing the first surface, the elongate portion of the control arm connector positioned against the first surface at a select one of a first set of plural mounting locations on the first surface, the first set of plural mounting locations being disposed in a first direction;

an outer support frame revolutely joined to the wheel hub assembly, the outer support frame having a third surface, the second surface of the inner support frame being positioned against the third surface at a select one of a second set of plural mounting locations on the third surface, the second set of plural mounting locations being disposed in a second direction approximately perpendicular to the first direction; and means for securing the control arm connector to the inner support frame and the inner support frame to the outer support frame.

9. A vehicle suspension control arm having a wheel alignment mechanism, comprising:

means for pivotally securing the control arm to a vehicle chassis;

a control arm connector joined to an apex portion of the control arm, the control arm connector having an elongate portion;

an inner support frame having a first surface and a second surface on a side of the inner support frame opposing the first surface, the elongate portion of the control arm connector positioned against the first surface at a select one of a first set of plural mounting locations on the first surface, the first set of plural mounting locations being disposed in a first direction;

an outer support frame revolutely joined to the wheel hub assembly, the outer support frame having a third surface, the second surface of the inner support frame being positioned against the third surface at a select one of a second set of plural mounting locations on the third surface, the second set of plural mounting locations being disposed in a second direction approximately perpendicular to the first direction; and means for securing the control arm connector to the inner support frame and the inner support frame to the outer support frame.

\* \* \* \* \*